United States Patent [19]

Mace et al.

[11] Patent Number: 5,776,589

[45] Date of Patent: Jul. 7, 1998

[54] COMOLDED MULTI-LAYER MONOVINYLAROMATIC/CONJUGATED DIENE BLOCK POLYMER BLEND SYSTEM, AND SHAPED ARTICLES DERIVED THEREFROM

[75] Inventors: Jean Michael Mace; Jacques Moerenhout, both of Ottignies, Belgium

[73] Assignee: Shell Oil Company, Houston, Tex.

[21] Appl. No.: 519,886

[22] Filed: Aug. 28, 1995

[30] Foreign Application Priority Data

Aug. 30, 1994 [EP] European Pat. Off. ............. 94306350

[51] Int. Cl.⁶ .................... B32B 25/04; B32B 25/14; B32B 27/32; B60R 21/20
[52] U.S. Cl. .................... 428/212; 428/36.8; 428/516; 428/517; 428/519; 280/728.1; 280/728.3
[58] Field of Search .................... 428/515, 516, 428/517, 519, 521, 43, 36.8, 212; 280/728.1, 728.3, 743.1

[56] References Cited

U.S. PATENT DOCUMENTS

| | | | |
|---|---|---|---|
| 5,106,917 | 4/1992 | Lee et al. | 525/229 |
| 5,110,647 | 5/1992 | Sawada et al. | 428/43 |
| 5,358,986 | 10/1994 | Onofusa et al. | 524/284 |

FOREIGN PATENT DOCUMENTS

WO93/10180  5/1993  WIPO .

*Primary Examiner*—Paul J. Thibodeau
*Assistant Examiner*—D. Lawrence Tarazano
*Attorney, Agent, or Firm*—Donald F. Haas

[57] ABSTRACT

A comolded multi-layered polymer blend system, comprising:

at least two layers, each layer having a continuous polymer network of an optionally hydrogenated block copolymer which comprise at least two terminal polymonovinylaromatic blocks and at least one central polyconjugated diene block, and at least one of said layers comprising the continuous polymer network of the block copolymer further comprises a co-continuous rigid polymer phase consisting of a homopolyalkylene or a copolymer of alkylenes having from 2 to 10 carbon atoms;

wherein the two layers are in intimate contact with each other;

wherein the layers have different contents by weight of the block copolymers; and wherein an extender is present in each polymer network such that the final weight ratio of the block copolymer and the extender in each layer is the same.

This comolded multi-layer polymer blend system is used to make air bags for automotive safety systems.

11 Claims, No Drawings

COMOLDED MULTI-LAYER MONOVINYLAROMATIC/CONJUGATED DIENE BLOCK POLYMER BLEND SYSTEM, AND SHAPED ARTICLES DERIVED THEREFROM

FIELD OF THE INVENTION

The present invention is relating to comolded multi-layer polymer blend systems and shaped articles derived therefrom and in particular to multi-layer polymer blend systems, which are aiming at a combination of different physical properties of each layer, to be reached by different contents of extender in the respective layers., each comprising block copolymers derived from a monovinyl aromatic and a conjugated diene.

BACKGROUND OF THE INVENTION

With the term comolded multi-layer polymer blend systems as used throughout the present specification, are meant multi-layer systems obtained by different methods such as coextrusion, insert molding and double injection molding double compression molding and the like.

Multi-layer systems, comprising at least one relatively softer layer consisting of block copolymer derived from a monovinyl aromatic and a conjugated diene and at least one layer of relatively hard, rigid polymer e.g. a polyalkylene, which had a close contact with each other, were known from European patent applications nos. 0301773, 0322,189, U.S. Pat. Nos. 4,332,850; 4,210,686; 3,242,038, Japanese patent applications nos. 61,213,145; 63,115711; 01,022,520; 01,022,519; 01,022,516; 63,115,711 and German patent application no. 37,31526.

Due to a more recent desire of combination of specific physical properties and improved adhesion between the layers of multi-layer polymer blend systems, without the use of adhesives or cost increasing special mating constructions, research efforts were directed later on to multi-layer polymer blend systems, which comprise in each of the respective layers a different amount of block copolymer, derived from a monovinyl aromatic and a conjugated diene, said block copolymers forming continuous network in the blends of the layers.

However, a clear shortcoming of such comoulded-layer polymer blend systems having an intimate contact with each other and comprising in each of the layers the beforementioned block copolymer, was generally appreciated to be the change of the original physical properties of said layers in the course of time under usual operation conditions of such layer systems.

More in particular it was found that the relatively extender rich layer of such a comolded multi-layer system showed a significant shrinkage, and a deterioration of the desired original softness, whereas the relatively extender poor, hard rigid layer showed a significant swelling accompanied by deterioration of the desired hardness.

It will be appreciated that there is a growing need for comolded multi-layer polymer blend systems, comprising at least two different layers, and preferably a two-layer system comprising at least one soft layer and at least one hard rigid layer, having an intimate contact with each other, wherein the layers containing different constituents of the hereinbefore mentioned block copolymers and extender, which substantially retain their desired original physical properties over a long period of time and which can meet the performance under operation conditions according to the requirements of the modern sophisticated applications.

Therefore it was an object of the present invention to provide said comolded multi-layer polymer blend systems which could meet the modern requirements over a long time period.

More in particular, it was an object of the present invention to provide comolded multi layer polymer blend systems, and preferably two layer polymer blend systems, both layer types of which were comprising different contents of the hereinbefore mentioned block copolymers in order to reach a desired improved adhesion between the two types of layers and the desired recyclability of said two-layer polymer blend systems after their use due to the present environmental requirements.

As a result of extensive research and experimentation such comolded two-layer polymer blend systems aimed at could surprisingly be found.

SUMMARY OF THE INVENTION

Accordingly, the present invention is relating to comolded multi-layer polymer blend systems, comprising at least two continuous polymer networks of optionally selectively hydrogenated block copolymers which comprise at least two terminal (monovinylaromatic) block and at least one central poly(conjugatediene) block and, which are in intimate contact with each other and which have different contents of said block copolymers and of extender and wherein the respective final weight ratios of said block copolymer and extender in each layer are substantially the same.

DETAILED DESCRIPTION OF THE INVENTION

Accordingly, the present invention is relating to comolded multi-layer polymer blend systems, comprising at least two continuous polymer networks of optionally selectively hydrogenated block copolymers which comprise at least two terminal (monovinylaromatic) block and at least one central poly(conjugatediene) block and, which are in intimate contact with each other and which have different contents of said block copolymers and of extender and wherein the respective final weight ratios of said block copolymer and extender in each layer are substantially the same.

The weight ratios of said block copolymer and extender are expressed as parts by weight of extender per 100 parts by weight of block copolymer (phr).

In general it was found that migration of extender will occur from one continuous block copolymer network in one layer to another continuous block copolymer network in another layer, if and as long as an extender concentration gradient between the block copolymer containing layers exists and the system reaches equilibrium when the gradient, expressed as phr extender contact, becomes substantially zero.

The observed migration behavior is strongly related to the specific physical properties and morphology of block copolymers derived from at least one monovinylaromatic monomer and at least one conjugated diene monomer.

Depending on the specific type of the other non-elastomeric polymer constituent of the polymer blends in the layers, co-continuous polymer network may be optionally formed in a layer e.g. in the case of using polyalkylene and in particular poly(propylene).

It will be appreciated that the said prevention of extender migration between comolded layers, comprising a continuous network of block copolymer which optionally has been combined with one or more non elastomeric polymers will be important in general for a great variety of combinations of said block copolymers on the one hand and a non-elastomeric additional polymer on the other hand. Examples of polymer combinations in layers, for which the retained physical properties of both co-molded layers is a prerequisite, for a variety of applications are e.g. the combination of a soft touching extender rich layer and a rigid hard, extender poor layer in automotive interior shaped articles and in particular air bag covers, both layers of which have to meet well balanced criteria, a combination of a soft outer layer and harder rigid pipe core wall, whereof the softer layer acts as a sealant layer; the combination of different layers, to be used in sterilizable medical containers, e.g. reusable blood bags, or footwear comprising multilayers comprising continuous networks of block copolymers, which must retain their respective physical properties over a long period.

It will be appreciated that each of the composing layers in the multi-layer systems of the present invention may contain the same or different non-elastomeric polymer in addition to the block copolymer constituent or no non-elastomeric polymer at all.

The comolded multi-layer polymer blend systems according to the present invention and in particular the two layer polymer blend systems, are characterized by a good adhesion between the layers and an attractive recyclability after use.

It will be appreciated that almost any type of combination of hardness and softness can be obtained with the multi-layer polymer blend systems.

As examples of the additional non-elastomeric polymer constituents of the multi-layer blends can be mentioned homopolymers of alkylenes or copolymers of alkylenes having from 2 to 16 carbon atoms, polystyrene or poly(a methylstyrene) or copolymers of styrene and α methylstyrene, polyphenylene ethers, polyphenylene sulfides, EVA, polyester, polyamide and polycarbonate.

Preferably these comolded multi-layer polymer blend systems will contain, in at least one layer, a co-continuous polyolefin polymer phase consisting of a homo-poly (alkylene) or a random copolymer of akylenes having from 2 to 10 carbon atoms or a block copolymer of such alkylenes. More preferably each of the layers will contain a homopoly(propylene) or a random copolymer of propylene as major constituent and another alkylene containing from 2 to 10 carbon atoms as minor constituent or a block copolymer of propylene and a lower alkylene and preferably ethylene.

The block copolymers to be incorporated into the comolded multi-layer polymer blend system in general may be selected from a great variety of potentially suitable ones, having at least two terminal poly(monovinylaromatic) block and at least one central poly(conjugated diene) block, forming a continuous network.

Preferably block copolymer constituents in both layers are selected from the group consisting of those of the formulae $A(BA)_m$ or $(AB)_n X$, wherein A represents a block of predominantly poly(monovinylaromatic), wherein B represents a block of predominantly poly(conjugated diene), wherein n represents an integer $\geq 1$ and m represents an integer $\geq 3$.

More preferably the blocks A represent predominantly poly(styrene) blocks and the B blocks represent predominantly poly(butadiene) or poly(isoprene).

With the term "predominantly" is meant that the respective blocks A and B may be mainly derived from monovinyl aromatic and conjugated diene, which monomers may be mixed with other structurally related or non-related co-monomers, e.g. mono-vinyl aromatic as main component and small amounts (up to 10%) of other monomers or butadiene mixed with isoprene or with small amounts of styrene.

More preferably the copolyiners contain pure poly (styrene), pure poly(isoprene) or pure poly(butadiene) blocks, of which the poly(isoprene) or poly(butadiene) blocks may be selectively hydrogenated to at most a residual ethylenic unsaturation of 20% and most preferably less than 5%. Most preferably the applied block copolymer has the structure ABA, wherein A has an apparent number average mol wt of from 3000 to 100,000, and preferably from 5000 to 20,000 and AB has an apparent number average mol wt of from 13,000 to 350,000 and preferably from 35000 to 120,000. The originally prepared poly(conjugated diene) blocks usually contain from 5 to 50 mol % vinyl groups, originating from 1,2 polymersiation relative to the conjugated diene molecules, and preferably a vinyl content from 10 to 25%.

The complete block copolymer to be used in the polymer blends according to the present invention, is normally containing bound vinyl aromatic in an amount of from 10 to 60% by weight and preferably from 15 to 45% by weight.

The apparent number average molecular weight of the total block copolymer will normally be in the range of from 20,000 to 350,000 and preferably in the range of from 40,000 to 200,000.

As examples of suitable pure block copolymers which can be used for the comolded multi-layer polymer blend systems can be mentioned polymers identified as KRATON G-1651, KRATON G-1654, KRATON G-1657, KRATON G 1650, KRATON G 1701, CARIFLEX TR 1101, CARIFLEX TR 1102, CARIFLEX TR 1107, CARITFLEX TR 1184, CARIFLEX TR 1186, CARIFLEX TR 4113, CARIFLEX TR 4122, CARIFLEX TR 4260, CARIFLEX TR 4262, KRATON D-1101, KRATON D-1102, KRATON D-1107, KRATON D-1111, KRATOND-1116,KRATOND-1117, KRATON D-1118, KRATOND-1122, KRATON D-1135X, KRATON-1184, KRATON D-1144X, KRATON D-1300X, KRATON D-4141, KRATON D-4158 (KRATON and CARIFLEX are trademarks of Shell Oil Company and its affiliates).

It will be appreciated that in the comolded multi-layer polymer blend systems a great variety of extender types can be successfully applied under the proviso that the hereinbefore specified relative contents in both layers are met.

Various plasticizing oils are useful as extender in the compositions to be used according to the present invention.

Plasticizing oils which have been found useful include petroleum derived oils, olefin oligomers, and low molecular weight polymers, as well as vegetable and animal oil which may be employed are relatively high boiling materials, containing only a minor proportion of aromatic hydrocarbons preferably less than 20% and more preferably less than 10% by weight of the oil. Most preferably the oil may be totally non-aromatic.

The oligomers may be a poly(α-olefin) such as poly (propylene), poly(butylene), poly(dodecene), hydrogenated poly(isoprene), hydrogenated poly(butadiene), hydrogenated poly(piperylene) and hydrogenated copolymers of piperylene and isoprene, having average molecular weights between 350 and 10,000.

Vegetable and animal oils include glyceryl esters of the usual fatty acids and polymerisation products thereof.

Examples of a preferred paraffinic oil are PRIMOL 352 (PRIMOL is a trademark) and the NAPVIS and HYVIS (trademarks) polyolefins, having a molecular weight in the range of from 500 to 6,000, and ETHYLFLO grades (ETHYLFLO is a trademark).

Preferably paraffinic oil or poly(alfaolefin) is used as extender in one or more of the layers of the multi-layer polymer blend system.

In general, comolded multi-layer polymers/blend systems according to the present invention can be produced by co-extrusion, double injection molding, compression molding and other usual molding processes.

It will be appreciated that the compositions from which the comolded multi-layer polymer blend systems are derived, may in addition contain one or more auxiliaries and more in particular fillers and/or stabilizers. Suitable examples of such fillers are consisting of glass fibres, talc, or calcium carbonate which may provide additional stiffness to one of the colayers.

It will be appreciated that the comolded multilayer polymer blend systems according to the present invention can be prepared by blending the individual constituents for each layer or starting from preblends containing two or more of the respective constituents.

A particular embodiment of the present invention, is formed by air bag covers, comprising a comolded multi-layer polymer blend system as specified hereinbefore and more in particular those manufactured from block copolymer compositions, formulated for use in the co-injection technique. Such air bag covers have appeared to be preferably composed of a stiff block copolymer containing composition, comprising a poly(olefin) in addition to the block copolymer, an extender, one or more fillers and additives, which composition is to be used as a core substate, and a different soft "cosmetic" block copolymer composition, comprising block copolymer, polyolefin, extender, fillers and additives, which is over molded onto the stiff core layer.

Stiff and soft layers in this technique display good adhesion between them. Moreover these layer systems can be efficiently recycled at the end of their first lifetime.

Preferably applied amounts of extender in the soft layers of these multi-layer polymer blend systems may range from 30 to 200 parts by weight per 100 parts by weight of block copolymer are applied. More preferably the amounts vary in the range from 50 to 120 parts by weight per 100 parts by weight of block copolymer.

The starting compositions from which the multi-layer polymer blend system for air bag covers is prepared may contain in addition to the block copolymer, non-elastomeric polymer and extender, one or more auxiliaries and more in particular fillers and/or stabilizers.

Suitable examples of such fillers are consisting of glass fibers, talc or calcium carbonate which may provide additional stiffness to one of the hard rigid layers of the system.

Fillers may be used in amounts of up to 300 phr relative to the block copolymer, and preferably in the range of from 100 to 300 phr, if any.

The stiff composition provides good strength in combination of good tearing and hinging behavior of the air bag cover upon inflation in the usual range of temperature i.e., from 35° C. to 85° C.

The soft composition, which optionally may be painted, provides the softer touch and can be formulated to give low tear strength, which has to be considered as an important requirement for good inflation behavior of the air bag module.

Such air bag covers show an excellent physical property retention upon ageing, including a good dimensional heat stability and in particular they show a shore A hardness in the range of from 30 to 80.

The invention will be further illustrated by the following examples, however, without restricting its cope to these embodiments.

EXAMPLES

1. Preparation of injection moulded slabs:

The preblended formulations W and X of which the compositions have been listed in Table 2 were molded into 2×100×150 mm plates which were subsequently used as inserts for a 2 mm thick overmolding with a soft KRATON G elastomer (S-EB-S) containing material, consisting of formulations U and V, the composition as well as typical mechanical properties of which have been listed in Table 1.

2. Aging of the samples:

The samples were placed in an air-circulating oven, at 95° C. for 1350 hours. After this aging period, the samples were weighed to determine the total weight loss.

3. Thermo-gravimetric analysis (TGA):

Samples of the hard and soft layer were isolated from the aged samples and subjected to TGA analyses. The conditions used have been listed in Table 4. From the results, the extender content in each layer after aging could be calculated and expressed in phr. An example of the calculation is given in Table 5 and all results have been listed in Table 6.

In respect of these tables, the following observations can be made.

Migration of the extender from the soft to the hard layer became visible as shrinkage of the soft layer and swelling of the hard layer. As an example, the thicknesses of the layers of block copolymer coblend layers were respectively 2.6 mm and 1.5 mm after aging compared with 2 mm each before aging.

Co-molded samples with ETHYLFLO 168 as extender showed significantly lower total weight loss after aging compared with those using paraffinic oil as extender. The insert-molded samples of formulations A and B on formulation X showed only 0.5% weight loss after 1350 hours at 95° C. This would indicate excellent non-fogging performance. As a comparison, formulation U or formulation V, overmolded onto formulation X, showed a weight loss of 2.6% and 2.7% after aging.

From TGA results the following conclusions may be drawn.

Both the ETHYLFLO 168 used to formulate compounds 40A and 70A and the paraffinic oil used in formulation U and V showed migration.

On the samples using formulation X as the insert, the extender content after aging was found to be virtually the same in both layers when expressed in phr.

For example:

Formulations U and X, formulated with 175 phr and 0 phr extender were measured at 54 phr and 56 phr respectively after aging.

Formulation B and Formulation X, formulated with 65 phr and 0 phr extender were measured at 29.5 phr and 29.2 phr respectively.

This behavior was also found on samples using formulation W as the insert. This "hard" compound was formulated with 100 phr of paraffinic oil.

For example:

Formulation V on formulation W, formulated with 150 phr and 100 phr extender, were measured at 111 phr and 126 phr respectively after aging.

TABLE 1

Soft Compounds

| Formulation (phr) | | Formulation A | Formulation B |
|---|---|---|---|
| KRATON G-1651 | | 30 | 30 |
| KRATON G-1657 | | 70 | 70 |
| ETHYLFLO 168 | | 65 | 65 |
| PP PY6100 | | 15 | 45 |
| IRGANOX 1010 | | 0.5 | 0.5 |
| TINUVIN 327 | | 1.0 | 1.0 |
| Properties * | | | |
| Hardness, | Shore A | 40 | 68 |
| 100% modulus, | MPa | 1.3/0.8 | 2.9/2.2 |
| Tensile strength, | MPa | 3.1/2.9 | 5.5/4.5 |
| Elongation at break, | % | 550/700 | 550/610 |
| Angle tear, | kN/m | 15/15 | 30/30 |
| Weight loss, 1350 hr at 95° C. | % | 0.2 | 0.0 |

(*) Physical properties aa/bb are measured in the mould direction/ perpendicular to the mold direction on injection molded slabs.

TABLE 2

Formulations used in Hard and soft layers

| preblend formulation (in phr) | U | V | W | X |
|---|---|---|---|---|
| KRATON G-1651 | 100 | 100 | 100 | — |
| KRATON G-1650 | — | — | — | 100 |
| KRATON G-1701 | — | — | — | 100 |
| Oil (PRIMOL 352) | 175 | 150 | 100 | — |
| PP (PY6100) | 25 | 40 | 120 | 200 |
| CaCO$_3$ (Durcal 5) | 180 | 180 | 150 | 100 |
| Anti-oxidants | 2.0 | 2.0 | 2.0 | 2.0 |
| Hardness, 15" | | | | |
| Shore A, | 45 | 62 | 90 | — |
| Shore D, | — | — | — | 42 |

TABLE 3

DEMAG D 150 injection molding conditions

| | | Soft overmolded compound | preblend formulation (inserts) |
|---|---|---|---|
| Temperatures, (°C.) | | | |
| Intake zone | | 35 | 35 |
| Cyclinder zone 1 | | 80 | 100 |
| Cylinder zone 2 | | 195 | 205 |
| Cylinder zone 3 | | 205 | 210 |
| Nozzle | | 210 | 215 |
| Melt | | 205 | 210 |
| Mold | | 40 | 40 |
| Injection time | s | 2.0 | 1.0 |
| Injection Pressure | bar | 90 | 150 |
| Holding pressure time | s | 4.0 | 4.0 |
| Holding pressure | bar | 75 | 110 |
| Back pressure | bar | 25 | 25 |
| Injection Speed | % | 60 | 90 |

TABLE 4

Thermo-gravimetric analysis conditions, (TGA), used for all compounds

| Temperature (°C.) | Delta T (°C./min) | Hold time (min) |
|---|---|---|
| 40 to 300 | 8 | — |
| 300 | — | 180 |
| 300 to 900 | 8 | — |

TABLE 5

Example of the calculation of oil migration from TGA analyses data

Formulation B

Soft formulation:

| | before aging | | After aging 1350 hrs at 95° .C | |
|---|---|---|---|---|
| | phr | % in formulation | % TGA | phr |
| KRATON G-1651 | 30 | } 69% | 81% { | 30 |
| KRATON G-1657 | 70 | | | 70 |
| Polypropylene | 45 | | | 45 |
| ETHYLFLO 168 | 65 | 31% | 16.5% | 29.5 |
| | Soft layer (70A) | | Soft layer (70A) | |
| | Hard layer (G-7880) | | Hard layer (G-7880) | |

Formulation X

Hard formulation:

| | before aging | | After 1350 hrs, 95° C. aging | |
|---|---|---|---|---|
| | phr | % in formulation | % TGA | phr |
| KRATON G-1650 | 50 | } 80% | 72% { | 50 |
| KRATON G-1701 | 50 | | | 50 |
| Polypropylene | 100 | | | 100 |
| CaCO$_3$ | 50 | 20% | 17.5% | 50 |
| Extender | 0 | 0% | 10.5% | 29.2 |

TABLE 6

Migration data after aging 1350 hours at 95° C. for various hard/soft co-moulded combinations, based on TGA analyses results

|  | Initial KG/PP | % ext. TGA | % pol. TGA | % KG TGA | Phr ext (aged) | Phr ext initial | % weight loss | Hardness levels: Shore |
|---|---|---|---|---|---|---|---|---|
| Formulation B | 100/45 | 16.5 | 81 | 55.9 | 29.5 | 65 | 0.3 | 70A |
| Formulation X | 200/200 | 10.5 | 72 | 36 | 29.2 | 0 |  | 42D |
| Formulation A | 100/15 | 18 | 81.5 | 70.9 | 25.4 | 65 | 0.5 | 40A |
| Formulation X | 200/200 | 11 | 71.6 | 35.8 | 30.7 | 0 |  | 42D |
| Formulation V | 100/40 | 14.3 | 38.6 | 27.6 | 51.8 | 150 | 2.7 | 62A |
| Formulation X | 200/200 | 15.5 | 68 | 34 | 45.6 | 0 |  | 42D |
| Formulation U | 100/25 | 16.0 | 36.8 | 29.5 | 54.3 | 175 | 2.6 | 45A |
| Formulation X | 200/200 | 18.3 | 65.5 | 32.8 | 55.8 | 0 |  | 42D |
| Formulation V | 100/40 | 26.2 | 33.0 | 23.6 | 111 | 150 | 3.1 | 62A |
| Formulation W | 100/120 | 25.8 | 44.8 | 20.4 | 126 | 100 |  | 90A |

% ext.: Percent extender
% pol.: Percent polymer
Phr: Per hundred rubber

From the combinations of compositions as listed in Table 6, air bag covers could be prepared, which could meet the following stringent requirements, due to the well fitting within the composition co-continuous network concept of KRATON G block copolymer grades and polypropylene:

(a) the hard composition has to provide structural stiffness part and should give good explosion and hinging performance (no brittle break) in the use temperature range from $-35°$ C. to $+85°$ C.

(b) the soft composition has to provide the "soft touch" and low mechanical properties for easy tearing in the hardness range from Shore A30 to 80.

The performance of the formulations A and B as listed in the preceding Tables could advantageously be combined with hard compositions having attractive properties.

We claim:

1. A comolded multi-layered polymer blend system, comprising:

at least two layers, each layer comprised of a blend which contains an optionally hydrogenated block copolymer which comprise at least two terminal polymonovinylaromatic blocks and at least one central polyconjugated diene block, and at least one of said layers comprising the blend of the block copolymer further comprises a co-continuous rigid polymer phase consisting of a homopolyalkylene or a copolymer of alkylenes having from 2 to 10 carbon atoms;

wherein the two layers are in intimate contact with each other;

wherein the layers have different contents by weight of the block copolymers; and wherein an extender is present in each polymer blend such that the final weight ratio of the block copolymer and the extender in each layer is the same.

2. The comolded multi-layer polymer blend system according to claim 1, wherein the co-continuous rigid polymer phase consists of homopolypropylene or a random copolymer of propylene as major constituent and another alkylene containing from 2 to 10 carbon atoms as minor constituent, or block copolymers of propylene and another lower alkylene containing from 2 to 10 carbon atoms.

3. The comolded multi-layer polymer blend system according to claim 2, wherein one of the blends of the block copolymer comprises a block copolymer of the formulae $A(BA)_m$ or $(AB)_n X$ wherein A represents a block of predominately poly(monovinylaromatic) and wherein B represents a block of predominantly poly(conjugated diene), wherein X represents the residue of a multivalent coupling agent and wherein n is an integer$\geq 3$ and m is an integer$\geq 1$.

4. The comolded multi-layer polymer blend system according to claim 3, characterized in that the A blocks are polystyrene blocks and the B blocks are polybutadiene or polyisoprene blocks.

5. The comolded multi-layer polymer blend system according to claim 3, wherein the B blocks have been selectively hydrogenated to a residual ethylenic unsaturation of at most 20%.

6. The comolded multi-layer polymer blend system according to claim 5, wherein the B blocks have been hydrogenated to residual ethylenic unsaturation of 5%.

7. The comolded multi-layered polymer blend system according to claim 5, wherein selectively hydrogenated block copolymers of the formula ABA have been incorporated in each layer of the polymer blend system.

8. The comolded multi-layer polymer blend system according to claim 7, wherein the blocks A have an apparent number average molecular weight in the range of from 3,000 to 100,000, and the block B has an apparent number average molecular weight in the range of from 13,000 to 350,000.

9. The comolded multi-layer polymer blend system according to claim 2, wherein homo polypropylene has been incorporated as the co-continuous rigid polymer phase.

10. The comolded multi-layer polymer blend system according to claim 1, wherein the extender in each polymer blend is selected from the group consisting of paraffinic oils and low molecular weight poly α-olefins having a weight average molecular weight of at most 10,000.

11. Air-bag covers comprising the comolded multi-layer polymer blend system according to claim 1.

* * * * *